US012730422B2

(12) United States Patent
Takami et al.

(10) Patent No.: US 12,730,422 B2
(45) Date of Patent: Sep. 8, 2026

(54) MODEL SELECTION APPARATUS, MODEL SELECTION METHOD, AND NON-TRANSITORY COMPUTER READABLE MEDIUM

(71) Applicant: Yokogawa Electric Corporation, Tokyo (JP)

(72) Inventors: Go Takami, Tokyo (JP); Hiromi Okamoto, Tokyo (JP); Masahiko Sato, Tokyo (JP); Hideyuki Fujii, Tokyo (JP); Yoshiyuki Jinguu, Tokyo (JP); Nobuhiro Mitomo, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 487 days.

(21) Appl. No.: 18/314,113

(22) Filed: May 8, 2023

(65) Prior Publication Data

US 2023/0384742 A1 Nov. 30, 2023

(30) Foreign Application Priority Data

May 26, 2022 (JP) ................................ 2022-085729

(51) Int. Cl.
*G05B 13/02* (2006.01)

(52) U.S. Cl.
CPC .................................. *G05B 13/027* (2013.01)

(58) Field of Classification Search
CPC .................................................... G05B 13/027
(Continued)

(56) References Cited

U.S. PATENT DOCUMENTS 8,971,571 B1 * 3/2015 Starner .................. G06V 20/20
382/103
10,866,936 B1 * 12/2020 Lisuk ...................... G06F 16/11
(Continued)

FOREIGN PATENT DOCUMENTS

JP 2021086283 A 6/2021
JP 2022035686 A 3/2022
JP 2022065773 A 4/2022

OTHER PUBLICATIONS

Office Action issued for counterpart Japanese Application No. 2022-085729, transmitted from the Japanese Patent Office on Jan. 7, 2025 (drafted on Dec. 24, 2024).
(Continued)

*Primary Examiner* — Jigneshkumar C Patel

(57) ABSTRACT

Provided is a model selection apparatus including a candidate model storage unit configured to store a plurality of candidate models each of which is generated by reinforcement learning using, as at least a part of a reward, an output of an evaluation model configured to output an indicator obtained by evaluating a state of equipment and is capable of output an action, a state data acquisition unit configured to acquire a plurality of pieces of state data representing the state of the equipment in a case where each of manipulated variables based on outputs of the plurality of candidate models is applied to a controlled object in the equipment, an indicator acquisition unit configured to acquire a plurality of indicators, a model selection unit configured to select an object model for controlling the controlled object, and an object model output unit configured to output the object model.

20 Claims, 10 Drawing Sheets

(58) Field of Classification Search
USPC ........................................................ 700/48
See application file for complete search history.

(56) References Cited

U.S. PATENT DOCUMENTS

| | | | | |
|---|---|---|---|---|
| 2021/0157280 | A1 | 5/2021 | Takami | |
| 2021/0174245 | A1 | 6/2021 | Lewis | |
| 2021/0247367 | A1* | 8/2021 | Lin | G01N 29/4472 |
| 2022/0121164 | A1 | 4/2022 | Iimori | |
| 2022/0366674 | A1* | 11/2022 | Kosaka | G06T 7/0002 |

OTHER PUBLICATIONS

Extended European Search Report for counterpart European Application No. 23172807.2, issued by the European Patent Office on Oct. 24, 2023.

Takuji Imai, "Yokogawa and NAIST Reinforcement Learning for Chemical Plants Achieves Advanced Control with Fewer Trials", Feb. 10, 2019, Nikkei Robotics Mar. 2019 issue, https://xtech.nikkei.com/atcl/nxt/mag/rob/18/012600001/00018/.

* cited by examiner

MODEL SELECTION APPARATUS, MODEL SELECTION METHOD, AND NON-TRANSITORY COMPUTER READABLE MEDIUM

The contents of the following Japanese patent application(s) are incorporated herein by reference:

NO. 2022-085729 filed in JP on May 26, 2022

BACKGROUND

1. Technical Field

The present invention relates to a model selection apparatus, a model selection method, and a non-transitory computer readable medium.

2. Related Art

Patent document 1 describes "a model 45 is configured to output a recommended control parameter representing control contents of a first type which is recommended to increase a reward value in response to an input of measurement data". In addition, Non-patent document 1 describes "FKDPP (Factorial Kernel Dynamic Policy Programming)".

LIST OF CITED REFERENCES

Patent Document

Patent document 1: Japanese Patent Application Publication No. 2021-086283

Non-Patent Document

Non-patent document 1: "Reinforcement Learning for Chemical Plant by Yokogawa Electric Corporation and NAIST", NIKKEI Robotics, March 2019

SUMMARY

According to a first aspect of the present invention, a model selection apparatus is provided. The model selection apparatus includes a candidate model storage unit configured to store a plurality of candidate models each of which is generated by reinforcement learning using, as at least a part of a reward, an output of an evaluation model configured to output an indicator obtained by evaluating a state of equipment and is capable of output an action according to the state of the equipment, a state data acquisition unit configured to acquire a plurality of pieces of state data representing the state of the equipment in a case where each of manipulated variables based on outputs of the plurality of candidate models is applied to a controlled object in the equipment, an indicator acquisition unit configured to acquire a plurality of indicators output by the evaluation model in response to an input of each of the plurality of pieces of state data, a model selection unit configured to select an object model for controlling the controlled object from among the plurality of candidate models based on the plurality of indicators, and an object model output unit configured to output the object model.

In the model selection apparatus, the model selection unit may select, as the object model, a candidate model that has output an action with which the indicator becomes the highest among the plurality of candidate models.

In any of the model selection apparatuses, the model selection unit may select, as the object model, a candidate model that has output an action with which an amount of statistics of the indicators at a plurality of time points becomes the highest among the plurality of candidate models.

In any of the model selection apparatuses, the amount of statistics may include at least any of an average value or a minimum value.

In any of the model selection apparatuses, the model selection unit may reselect the object model in response to an update of the evaluation model.

In any of the model selection apparatuses, the model selection unit may reselect the object model in response to a lapse of a predetermined time period.

Any of the model selection apparatuses may further include an input unit configured to accept a user input in response to an output of the object model.

Any of the model selection apparatuses may further include a control unit configured to control the controlled object by using the object model.

Any of the model selection apparatuses may further include an operation model generation unit configured to generate, by the reinforcement learning, a plurality of operation models to serve as the plurality of candidate models.

Any of the model selection apparatuses may further include an evaluation model storage unit configured to store the evaluation model.

Any of the model selection apparatuses may further include an evaluation model generation unit configured to generate the evaluation model by machine learning.

According to a second aspect of the present invention, there is provided a model selection method. The model selection method is executed by a computer to cause the computer to perform operations including storing a plurality of candidate models each of which is generated by reinforcement learning using, as at least a part of a reward, an output of an evaluation model configured to output an indicator obtained by evaluating a state of equipment and is capable of output an action according to the state of the equipment, acquiring a plurality of pieces of state data representing the state of the equipment in a case where each of manipulated variables based on outputs of the plurality of candidate models is applied to a controlled object in the equipment, acquiring a plurality of indicators output by the evaluation model in response to an input of each of the plurality of pieces of state data, selecting an object model for controlling the controlled object from among the plurality of candidate models based on the plurality of indicators, and outputting the object model.

According to a third aspect of the present invention, there is provided a non-transitory computer readable medium having recorded thereon a model selection program. The model selection program is executed by a computer to cause the computer to function as a candidate model storage unit configured to store a plurality of candidate models each of which is generated by reinforcement learning using, as at least a part of a reward, an output of an evaluation model configured to output an indicator obtained by evaluating a state of equipment and is capable of output an action according to the state of the equipment, a state data acquisition unit configured to acquire a plurality of pieces of state data representing the state of the equipment in a case where each of manipulated variables based on outputs of the plurality of candidate models is applied to a controlled object in the equipment, an indicator acquisition unit configured to acquire a plurality of indicators output by the evaluation model in response to an input of each of the plurality of pieces of state data, a model selection unit configured to select an object model for controlling the controlled object from among the plurality of candidate models based on the plurality of indicators, and an object model output unit configured to output the object model.

Note that the summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described by way of embodiments of the invention. However, the following embodiments do not limit the invention according to the claims. In addition, not all of the combinations of features described in the embodiments are essential to solving means of the invention.

Figure 1:
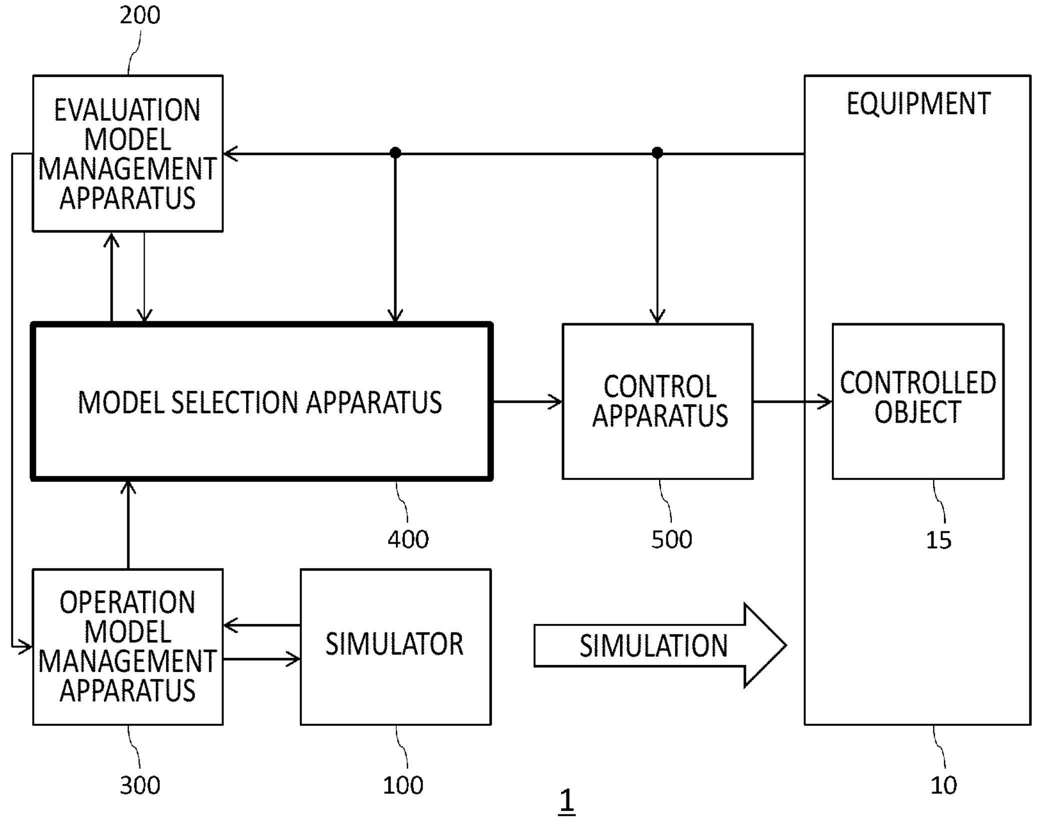
FIG. 1 illustrates an example of a block diagram of a control system 1.

FIG. 1 illustrates an example of a block diagram of a control system 1. Note that these blocks are functional blocks that are each functionally divided, and may not be necessarily required to be matched with actual apparatus configurations. That is, in the present drawing, an apparatus indicated by one block may not be necessarily required to be configured by one apparatus. In addition, in the present drawing, apparatuses indicated by separate blocks may not be necessarily required to be configured by separate apparatuses. The same applies to subsequent block diagrams.

In the control system 1, an evaluation model configured to output an indicator obtained by evaluating a state of equipment 10 is generated by machine learning, and an operation model is generated by reinforcement learning using an output of the evaluation model as at least a part of a reward. Then, in the control system 1, a controlled object 15 in the equipment 10 is controlled by using the generated operation model. Such a control using the operation model is also referred to as an AI (artificial intelligence) control. When a plurality of operation models is available for the AI control in such a control system 1, a model selection apparatus 400 according to the present embodiment is configured to select a model to be used for the control from among a plurality of candidates.

The equipment 10, a simulator 100, an evaluation model management apparatus 200, an operation model management apparatus 300, the model selection apparatus 400, and a control apparatus 500 may be included in the control system 1.

The equipment 10 is a facility or an apparatus to which the controlled object 15 is provided. For example, the equipment 10 may be a plant or may be a combined apparatus obtained by combining a plurality of pieces of instrument. Examples of the plant may include a plant for managing and controlling wells such as a gas field and an oil field and surroundings thereof, a plant for managing and controlling hydroelectric, thermo electric and nuclear power generations and the like, a plant for managing and controlling environmental power generation such as solar power and wind power, a plant for managing and controlling water and sewerage, a dam, and the like, etc., in addition to chemical and bio industrial plants and the like.

Hereinafter, a case where the equipment 10 is a distillation apparatus that is one of process apparatuses will be described as an example. In general, the distillation apparatus is configured to cause low-boiling components in a distillation column to evaporate to be extracted from a column top, and cause vapor of the extracted low-boiling components to be condensed by a condenser to be stored in a reflux drum. Then, the distillation apparatus is configured to reflux some stored in the reflux drum into the distillation column to be contacted by vapor in the distillation column and distilled into low-boiling components and high-boiling components. In such a distillation apparatus, as an example, in order to control a reflux amount, a control for opening and closing a valve provided between the reflux drum and the distillation column is performed.

The controlled object 15 is instrument provided to the equipment 10 and set as an object to be controlled. For example, the controlled object 15 may be an actuator such as a valve, a heater, a motor, a fan, and a switch configured to control physical quantities of at least one of an amount of material body, a temperature, a pressure, a flow rate, a speed, a pH, or the like in a process of the equipment 10, that is, may be an operation end, and perform a given operation according to a manipulated variable. Hereinafter, a case where the controlled object 15 is a valve provided between the reflux drum and the distillation column in the distillation apparatus will be describes as an example. However, the present invention is not limited to this. The controlled object 15 may be a controller configured to control an operation end. That is, a term "control" used in the present specification includes direct control of the operation end, and in addition to this, the term may be interpreted in a broad sense to include indirect control of the operation end via a controller.

The equipment 10 to which the controlled object 15 is provided may be provided with one or more sensors capable of measuring various states (physical quantities) inside and outside the equipment 10. As an example, when the equipment 10 is the distillation apparatus, the sensor may output a process variable PV obtained by measuring a temperature at various positions of the distillation apparatus (for example, a column top, a column center, a column bottom, and the like), a flow rate in various paths, or the like. State data representing the state of the equipment 10 may include such a process variable PV. In addition, the state data may include a manipulated variable MV representing an opening and closing decree of the valve that is the controlled object 15. In addition to performance data representing a performance state obtained as a result by performing the control of the controlled object 15 in this manner, the state data may include consumption data representing consumption of energy or a raw material in the equipment 10, disturbance environment data representing physical quantities which may act as disturbance to the control of the controlled object 15, and the like.

The distillation apparatus is one of apparatuses very commonly used in petroleum and chemical processes, and has such a feature that mutual interference of the column top and the column bottom is intense, a time constant is long, and an operation is nonlinear. When the control for opening and closing of the valve is to be performed by PID (Proportional Integral Differential) or the like in order to control the reflux amount in such a distillation apparatus, it has been difficult to achieve an improvement of controllability. In addition, when an operator is to manually operate such a valve for a purpose of a plurality of items such as quality assurance, energy saving, reduction of GHG (GreenHouse Gas), and improvement of yield, how much the control for opening and closing of the valve is performed has largely depended on an experience or a hunch of the operator.

In view of the above, when the control for opening and closing of such a valve is to be performed, it is conceivable to use an operation model generated by reinforcement learning. The model selection apparatus 400 according to the present embodiment may set such an operation model as an object to be selected, for example.

The simulator 100 is configured to simulate an operation in the equipment 10. For example, the simulator 100 may be designed based on design information in the equipment 10, and performs a behavior simulating the operation in the equipment 10. The simulator 100 outputs simulated data obtained by simulating a state in the equipment 10 (for example, a prediction value of the sensor) as an environment changes by acquiring a signal simulating a manipulated variable for the controlled object 15. As an example, the simulator 100 may be configured by a predictive model configured to predict a state of the distillation apparatus and a plant control simulator. The predictive model may be capable of predicting a state change of a reactor from accumulated process data by using a modeling technique of time-series data using deep learning. In addition, the plant control simulator may be capable of virtually simulating PID control for deriving the manipulated variable MV by a difference between a set variable SV and a control variable CV for the controlled object 15. That is, the simulator 100 may be capable of simulating the behavior itself in the equipment 10 in addition to a state prediction value.

The evaluation model management apparatus 200 is configured to manage the evaluation model configured to output the indicator obtained by evaluating the state of the equipment 10. For example, the evaluation model management apparatus 200 may generate an evaluation model by machine learning, and store the generated evaluation model in its own apparatus. In addition, the evaluation model management apparatus 200 may output the generated evaluation model to the operation model management apparatus 300.

The operation model management apparatus 300 is configured to manage a plurality of operation models for outputting an action according to the state in the equipment 10. For example, the operation model management apparatus 300 may generate a plurality of operation models by reinforcement learning using, as at least a part of a reward, an output of the evaluation model managed by the evaluation model management apparatus 200, and store the plurality of generated operation models in its own apparatus. In addition, the operation model management apparatus 300 may output the plurality of generated operation models to the model selection apparatus 400.

When a plurality of operation models is available for the AI control, the model selection apparatus 400 selects a model to be used for the control from among a plurality of candidates. For example, the model selection apparatus 400 may acquire, as a plurality of candidate models, a plurality of operation models managed by the operation model management apparatus 300, and select an object model for controlling the controlled object 15 from among the plurality candidate models. In addition, the model selection apparatus 400 may output the selected object model to the control apparatus 500.

The control apparatus 500 is configured to control the controlled object 15 by using the object model. For example, the control apparatus 500 may control the controlled object 15 in the equipment 10 by using the object model selected by the model selection apparatus 400.

In this manner, in the control system 1, AI is configured to automatically discover a bottleneck (potential fault) in the operation, and generate an indicator for an improvement as an evaluation model. Then, AI is configured to generate an operation model configured to instruct a further improved operation method through a trial and error process based on the applied indicator. With this configuration, in accordance with the control system 1, an environment in which the equipment 10 can be autonomously controlled by using an AI technique is provided. When a plurality of operation models is available for the AI control in such a control system 1, a model selection apparatus 400 according to the present embodiment is configured to select a model to be used for the control from among a plurality of candidates. With regard to this, a detail of each apparatus will be described in turn.

Figure 2:
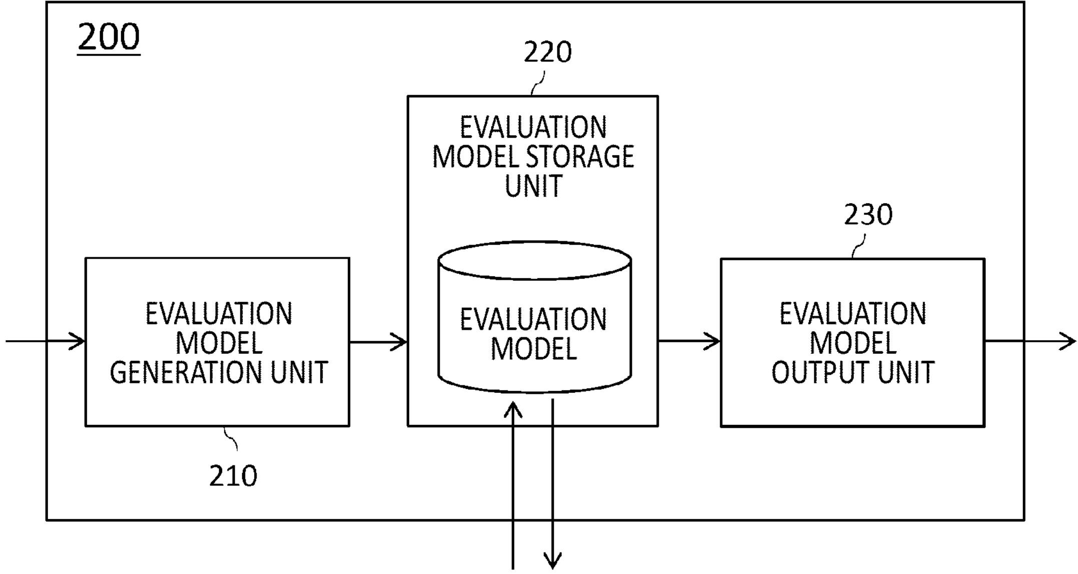
FIG. 2 illustrates an example of a block diagram of an evaluation model management apparatus 200.

FIG. 2 illustrates an example of a block diagram of the evaluation model management apparatus 200. The evaluation model management apparatus 200 may be a computer such as a PC (personal computer), a tablet type computer, a smartphone, a workstation, a server computer, or a general purpose computer, or may be a computer system obtained by connecting a plurality of computers. Such a computer system is also a computer in a broad sense. In addition, the evaluation model management apparatus 200 may be implemented by one or more executable virtual computer environments in the computer. Instead of this, the evaluation model management apparatus 200 may be a special purpose computer designed for managing an evaluation model, or may be special purpose hardware achieved by dedicated circuitry. In addition, when being connectable to the Internet, the evaluation model management apparatus 200 may be achieved by cloud computing.

The evaluation model management apparatus 200 includes an evaluation model generation unit 210, an evaluation model storage unit 220, and an evaluation model output unit 230.

The evaluation model generation unit 210 is configured to generate an evaluation model for outputting an indicator obtained by evaluating a state of the equipment 10. For example, the evaluation model generation unit 210 may acquire an operation target (plant KPI (Key Performance Indicator) or the like) in the equipment 10, state data representing a state of the equipment 10, and a teacher label, and generate labeling data based on these. Then, the evaluation model generation unit 210 may generate an evaluation model by an algorithm of machine learning using the generated labeling data as learning data. Since processing of generating an evaluation model itself may be optional, a description of its further detail will be omitted herein. The evaluation model generation unit 210 supplies the generated evaluation model to the evaluation model storage unit 220.

The evaluation model storage unit 220 is configured to store an evaluation model. For example, the evaluation model storage unit 220 may store the evaluation model generated by the evaluation model generation unit 210. Note that in the above description, a case where the evaluation model storage unit 220 stores the evaluation model generated inside the evaluation model management apparatus 200 has been illustrated as an example, but the configuration is not limited to this. The evaluation model storage unit 220 may store an evaluation model generated outside the evaluation model management apparatus 200. The evaluation model storage unit 220 duplicates the stored evaluation model to be supplied to the evaluation model output unit 230.

The evaluation model output unit 230 is configured to output an evaluation model. For example, the evaluation model output unit 230 may output the evaluation model duplicated by the evaluation model storage unit 220 to the operation model management apparatus 300 via a network.

Figure 3:
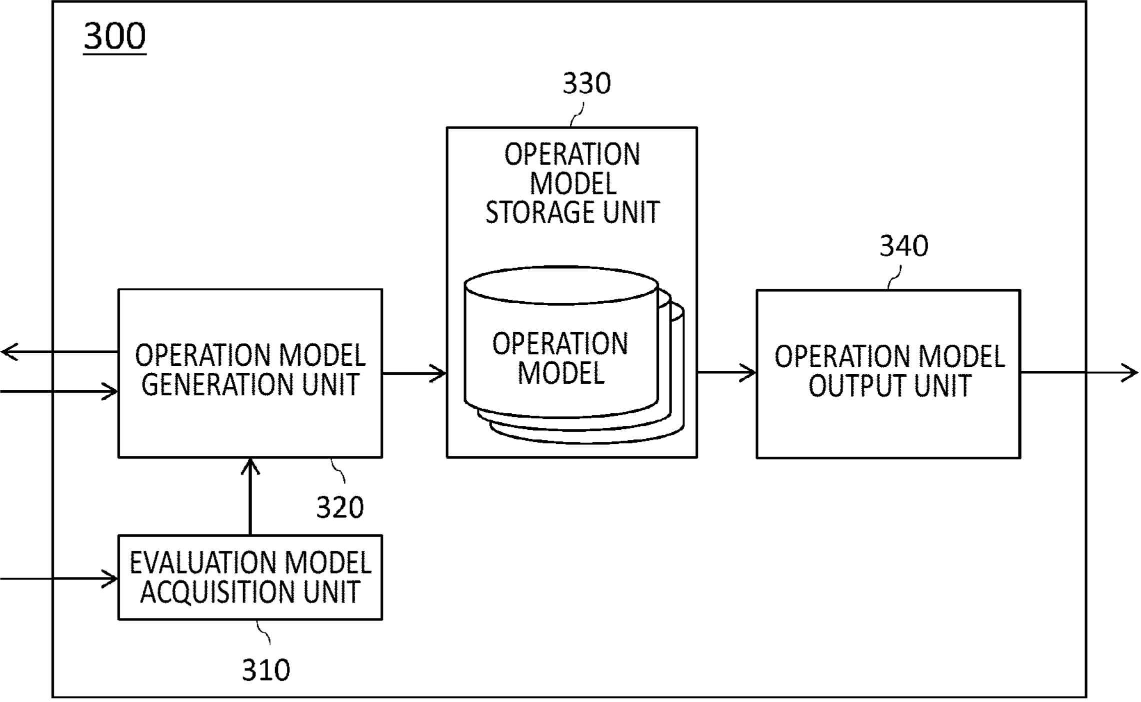
FIG. 3 illustrates an example of a block diagram of an operation model management apparatus 300.

FIG. 3 illustrates an example of a block diagram of the operation model management apparatus 300. Similarly as in the evaluation model management apparatus 200, the operation model management apparatus 300 may also be a computer, or may also be a computer system obtained by connecting a plurality of computers. In addition, the operation model management apparatus 300 may be implemented by one or more executable virtual computer environments in the computer. Instead of this, the operation model management apparatus 300 may be a special purpose computer designed for managing an operation model, or may be special purpose hardware achieved by dedicated circuitry. In addition, when being connectable to the Internet, the operation model management apparatus 300 may be achieved by cloud computing.

The operation model management apparatus 300 includes an evaluation model acquisition unit 310, an operation model generation unit 320, an operation model storage unit 330, and an operation model output unit 340.

The evaluation model acquisition unit 310 is configured to acquire an evaluation model for outputting an indicator obtained by evaluating a state of the equipment 10. For example, the evaluation model acquisition unit 310 may acquire the evaluation model output from the evaluation model output unit 230 via a network. The evaluation model acquisition unit 310 supplies the acquired evaluation model to the operation model generation unit 320.

The operation model generation unit 320 is configured to generate, by reinforcement learning using an output of an evaluation model as at least a part of a reward, a plurality of operation models capable of outputting an action according to a state of the equipment 10. As an example, such an operation model may have a data table constituted by a combination (S, A) of S representing a set of pieces of sampled state data and an action A taken under each state, and a weight W calculated by a reward. Note that the output of the evaluation model may be used as at least a part of the reward for calculating such a weight W.

When such an operation model is to be generated, the operation model generation unit 320 may acquire learning environment data representing a state of a learning environment. At this time, when the simulator 100 for simulating the operation in the equipment 10 as the learning environment is used, the operation model generation unit 320 may acquire simulated data from the simulator 100 as the learning environment data. However, the present invention is not limited to this. The actual equipment 10 may be used as the learning environment. In this case, the operation model generation unit 320 may acquire the state data representing the state of the equipment 10 as the learning environment data.

Then, the operation model generation unit 320 may decide an action randomly or by using a known AI algorithm such as FKDPP which will be described below, and apply a manipulated variable based on the action to the controlled object in the learning environment. The state of the learning environment changes according to this.

Then, the operation model generation unit 320 may acquire the learning environment data again. As a result, the operation model generation unit 320 can acquire the state of the learning environment after the change according to the application of the manipulated variable based on the decided action to the controlled object.

Then, the operation model generation unit 320 may calculate a reward value based on at least in part the output of the evaluation model. As an example, in response to an input of a learning environment data representing a state of the learning environment after the change to an evaluation model, an indicator output by the evaluation model may be calculated as the reward value as it is.

After repeating the processing of acquiring the state according to a decision of such an action for a plurality of times, the operation model generation unit 320 may update the operation model by adding new sample data that has not been saved so far to a new row in the data table in addition to overwrite of a value of a weight column in the data table. The operation model generation unit 320 can generate the operation model by repeating such update processing for a plurality of times. Since the generation of the operation model itself may be optional, description of its further detail will be omitted herein.

The operation model generation unit 320 can generate a plurality of operation models different from each other by executing the processing of generating such an operation model, for example, under different learning environments or by different learning algorithms. The operation model generation unit 320 supplies the plurality of generated operation models to the operation model storage unit 330.

The operation model storage unit 330 is configured to store a plurality of operation models. For example, the operation model storage unit 330 may store the plurality of operation models generated by the operation model generation unit 320. Note that in the above description, a case where the operation model storage unit 330 stores the plurality of operation models generated inside the operation model management apparatus 300 has been illustrated as an example, but the configuration is not limited to this. The operation model storage unit 330 may store a plurality of operation models a part or whole of which has been generated outside the operation model management apparatus 300. The operation model storage unit 330 duplicates the plurality of stored operation models to be supplied to the operation model output unit 340.

The operation model output unit 340 is configured to output a plurality of operation models. For example, the operation model output unit 340 may output the plurality of operation models duplicated by the operation model storage unit 330 to the model selection apparatus 400 via a network.

Figure 4:
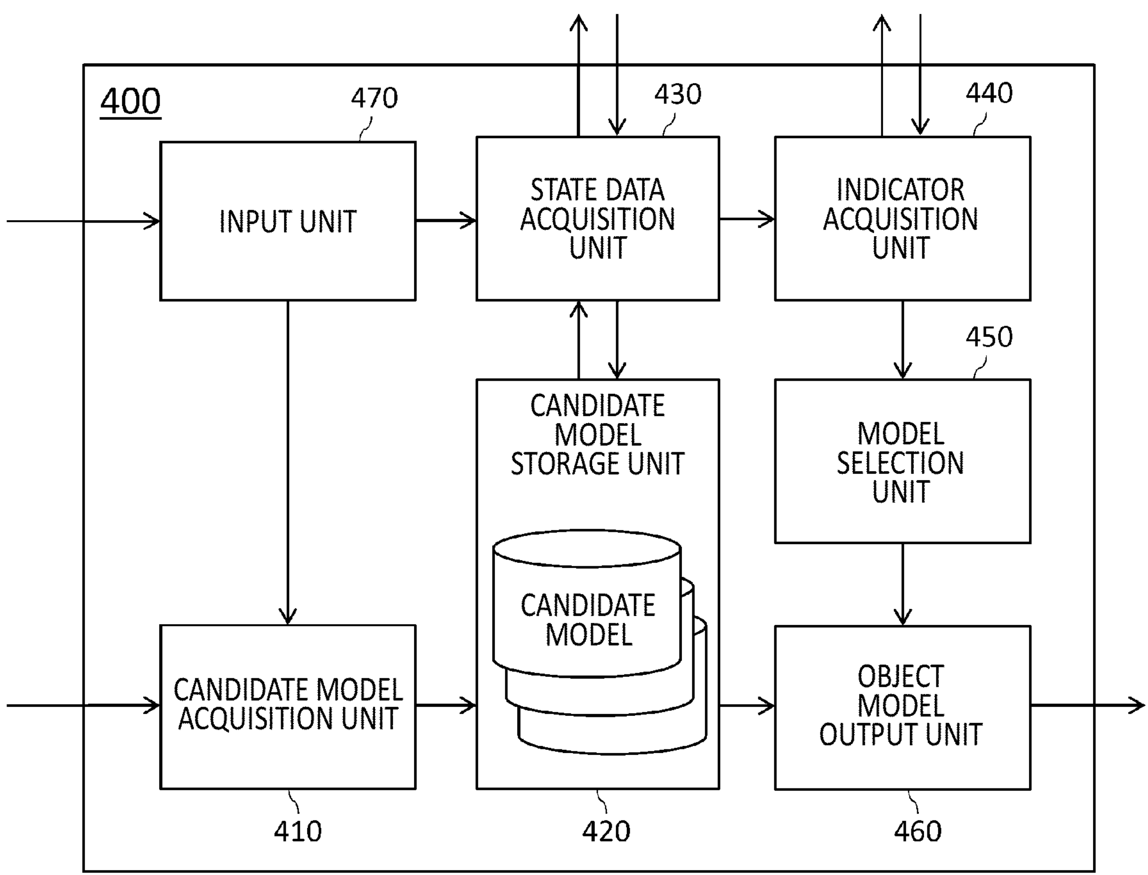
FIG. 4 illustrates an example of a block diagram of a model selection apparatus 400 according to the present embodiment.

FIG. 4 illustrates an example of a block diagram of the model selection apparatus 400 according to the present embodiment. Similarly as in the evaluation model management apparatus 200, the model selection apparatus 400 may also be a computer, or may also be a computer system obtained by connecting a plurality of computers. In addition, the model selection apparatus 400 may be implemented by one or more executable virtual computer environments in the computer. Instead of this, the model selection apparatus 400 may be a special purpose computer designed for selecting a model, or may be special purpose hardware achieved by dedicated circuitry. In addition, when being connectable to the Internet, the model selection apparatus 400 may be achieved by cloud computing.

The model selection apparatus 400 includes a candidate model acquisition unit 410, a candidate model storage unit 420, a state data acquisition unit 430, an indicator acquisition unit 440, a model selection unit 450, an object model output unit 460, and an input unit 470.

The candidate model acquisition unit 410 is configured to acquire a plurality of candidate models. For example, the candidate model acquisition unit 410 may acquire the plurality of operation models output by the operation model output unit 340 as the plurality of candidate models. The candidate model acquisition unit 410 supplies the plurality of acquired candidate models to the candidate model storage unit 420.

The candidate model storage unit 420 is configured to store a plurality of candidate models. For example, the candidate model storage unit 420 may store the plurality of candidate models acquired by the candidate model acquisition unit 410. For example, in this manner, the candidate model storage unit 420 can store the plurality of candidate models each of which is generated by reinforcement learning using, as at least a part of a reward, an output of an evaluation model configured to output an indicator obtained by evaluating a state of the equipment and is capable of output an action according to the state of the equipment 10.

The state data acquisition unit 430 is configured to acquire a plurality of pieces of state data. For example, the state data acquisition unit 430 may acquire a plurality of pieces of state data representing the state of the equipment 10 in a case where each of manipulated variables based on outputs of the plurality of candidate models stored in the candidate model storage unit 420 is applied to the controlled object 15 in the equipment 10. The state data acquisition unit 430 supplies the plurality of piece of acquired state data to the indicator acquisition unit 440.

The indicator acquisition unit 440 is configured to acquire a plurality of indicators. For example, the indicator acquisition unit 440 may acquire a plurality of indicators output by the evaluation model in response to an input of each of the plurality of pieces of state data acquired by the state data acquisition unit 430. The indicator acquisition unit 440 supplies the plurality of acquired indicators to the model selection unit 450.

The model selection unit 450 is configured to select an object model. For example, the model selection unit 450 may select an object model for controlling the controlled object 15 from among the plurality of candidate models stored in the candidate model storage unit 420 based on the plurality of indicators acquired by the indicator acquisition unit 440. The model selection unit 450 supplies information for identifying the selected object model to the object model output unit 460.

The object model output unit 460 is configured to output an object model. For example, the object model output unit 460 may duplicate an object model from among the plurality of candidate models stored in the candidate model storage unit 420 according to the information for identifying the object model selected by the model selection unit 450. Then, the object model output unit 460 may output the object model to the control apparatus 500 via a network.

The input unit 470 is configured to accept a user input. For example, the input unit 470 may accept a user input in response to an output of an object model by the object model output unit 460. Then, when the object model is to be reselected, the input unit 470 may trigger the acquisition of the plurality of pieces of state data by the state data acquisition unit 430 and the acquisition of the plurality of candidate models by the candidate model acquisition unit 410.

Figure 5:
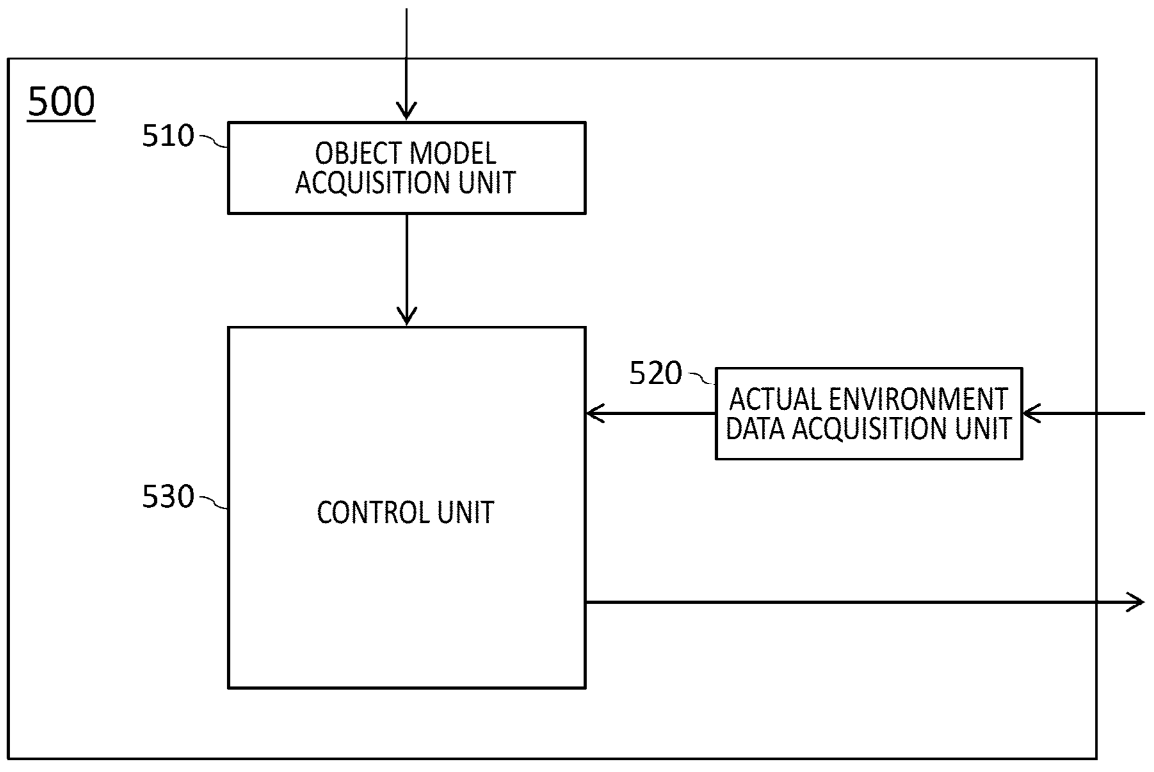
FIG. 5 illustrates an example of a block diagram of a control apparatus 500.

FIG. 5 illustrates an example of a block diagram of the control apparatus 500. For example, the control apparatus 500 may be a controller in a distributed control system (DCS), or may be a medium scale instrumentation system, a real-time OS controller, or the like.

The control apparatus 500 includes an object model acquisition unit 510, an actual environment data acquisition unit 520, and a control unit 530.

The object model acquisition unit 510 is configured to acquire an object model. For example, the object model acquisition unit 510 may acquire the object model output by the object model output unit 460 via a network. The object model acquisition unit 510 supplies the acquired object model to the control unit 530.

The actual environment data acquisition unit 520 is configured to acquire actual environment data representing a state of an actual environment, that is, the equipment 10. Such actual environment data may be data similar to the state data described above. The actual environment data acquisition unit 520 is configured to supply the acquired actual environment data to the control unit 530.

The control unit 530 is configured to control the controlled object 15 by using an object model. For example, the control unit 530 may decide an action by a known AI algorithm such as FKDPP which will be described below. Then, the control unit 530 may apply a manipulated variable obtained by adding the decided action to a value of the controlled object 15 to the controlled object 15 in the equipment 10. For example, in this manner, the control unit 530 can perform the AI control of the controlled object 15 by using the object model selected by the model selection apparatus 400.

Figure 6:
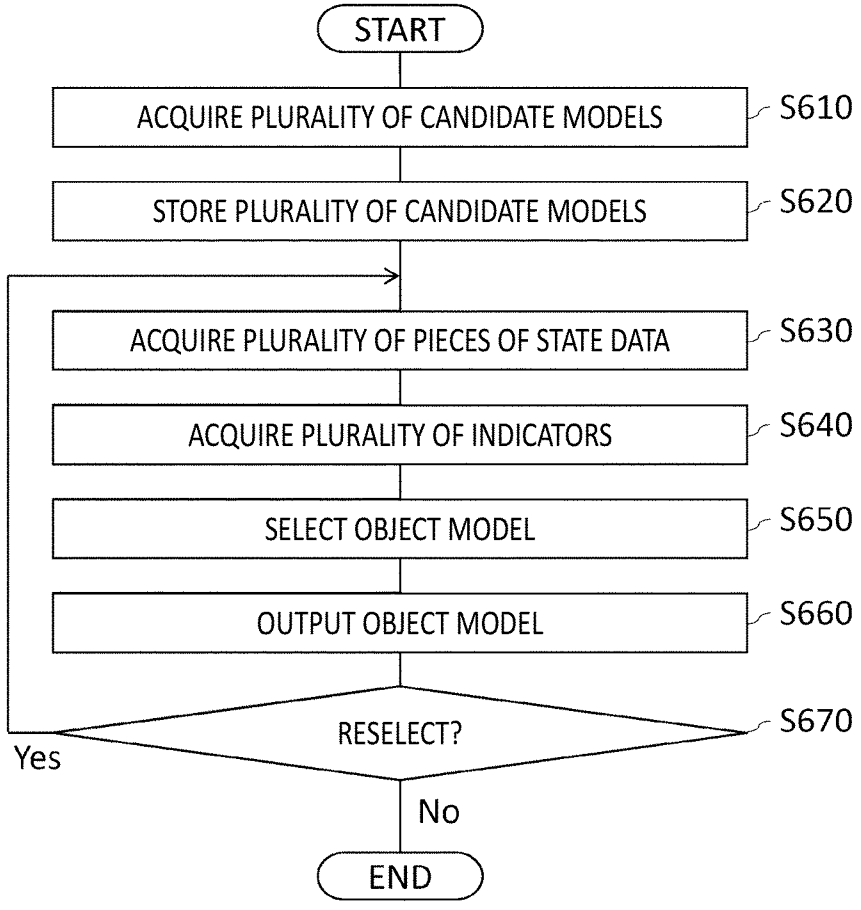
FIG. 6 illustrates an example of a flow diagram of a model selection method which may be executed by the model selection apparatus 400 according to the present embodiment.

FIG. 6 illustrates an example of a flow diagram of a model selection method which may be executed by the model selection apparatus 400 according to the present embodiment.

In step S610, the model selection apparatus 400 acquires a plurality of candidate models. For example, the candidate model acquisition unit 410 may acquire the plurality of operation models output by the operation model output unit 340 as the plurality of candidate models from the operation model management apparatus 300 via a network. However, the present invention is not limited to this. The candidate model acquisition unit 410 may acquire a plurality of candidate models via other means different from a network (such as various types of memory devices or a user input), or may acquire a plurality of candidate models from another device different from the operation model management apparatus 300. The candidate model acquisition unit 410 supplies the plurality of acquired candidate models to the candidate model storage unit 420.

In step S620, the model selection apparatus 400 stores a plurality of candidate models. For example, the candidate model storage unit 420 may store the plurality of candidate models acquired in step S610. Note that in the above description, a case where the candidate model storage unit 420 stores the plurality of candidate models acquired from the other device such as the operation model management apparatus 300 has been illustrated as an example, but the configuration is not limited to this. The candidate model storage unit 420 may store a plurality of candidate models in advance. For example, in this manner, the candidate model storage unit 420 can store the plurality of candidate models each of which is generated by reinforcement learning using, as at least a part of a reward, an output of an evaluation model configured to output an indicator obtained by evaluating a state of the equipment 10 and is capable of output an action according to the state of the equipment 10. In other words, the candidate model storage unit 420 can store a plurality of mutually different candidate models generated under different learning environments or by different learning algorithms by using outputs of a common evaluation model as at least a part of a reward. Herein, as an example, it is assumed that the candidate model storage unit 420 stores three candidate models of a candidate model x, a candidate model y, and a candidate model z.

In step S630, the model selection apparatus 400 acquires a plurality of pieces of state data. For example, the state data acquisition unit 430 may acquire various physical quantities measured by various types of sensors provided to the equipment 10 as the state data from the equipment 10 via a network. However, the present invention is not limited to this. The state data acquisition unit 430 may acquire the state data via other means different from a network, or may acquire the state data from another device different from the equipment 10.

Then, the state data acquisition unit 430 may respectively decide a plurality of actions by using the plurality of candidate models stored in step S620 by a known AI algorithm such as FKDPP. When such a kernel method is used, the state data acquisition unit 430 may generate a vector of the state S from a sensor value obtained from the acquired state data. Then, the state data acquisition unit 430 may generate, as an action decision table, a combination of the state S and all actions A that may be taken. Then, the state data acquisition unit 430 may input the action decision table to each of the plurality of candidate models stored in step S620. In response to this, each of the plurality of candidate models may perform kernel calculation between each row of the action decision table and each sample data except for the weight column in the data table to respectively calculate a distance between each sample data. Then, each of the plurality of candidate models may calculate a reward expectation value in each action by subsequently adding a value obtained by multiplying the distance calculated for each sample data by a value of each of the weight columns. For example, in this manner, the state data acquisition unit 430 may decide a plurality of actions by selecting each of actions determined to have a highest reward expectation value by using a plurality of candidate models. In other words, the state data acquisition unit 430 may decide, for each candidate model, an action determined for each of the plurality of candidate models to increase the reward expectation value the most according to the state of the equipment Herein, as an example, the state data acquisition unit 430 decides an action Ax by using the candidate model x, decides an action Ay by using the candidate model y, and decides an action Az by using the candidate model z.

Then, the state data acquisition unit 430 may apply, to the controlled object 15 via the control apparatus 500, each of manipulated variables obtained by adding the plurality of decided actions to a value of the controlled object 15. In response to this, the state of the equipment 10 changes. The state data acquisition unit 430 may further acquire state data representing the state of the equipment after the change. For example, in this manner, the state data acquisition unit 430 may acquire the plurality of pieces of state data representing the state of the equipment 10 in a case where each of manipulated variables based on outputs of the plurality of candidate models is applied to the controlled object 15 in the equipment 10. Herein, it is assumed that the state data acquisition unit 430 acquires state data Sx in a case where a manipulated variable MVx based on the action Ax is applied to the controlled object 15, acquires state data Sy in a case where a manipulated variable MVy based on the action Ay is applied to the controlled object 15, and acquires state data Sz in a case where a manipulated variable MVz based on the action Az is applied to the controlled object 15. The state data acquisition unit 430 supplies the plurality of pieces of acquired state data to the indicator acquisition unit 440.

In step S640, the model selection apparatus 400 acquires a plurality of indicators. For example, the indicator acquisition unit 440 may respectively input the plurality of pieces of state data acquired in step S630 to an evaluation model stored in the evaluation model storage unit 220 to respectively acquire a plurality of indicators output by the evaluation model. For example, in this manner, the indicator acquisition unit 440 may acquire the plurality of indicators output by the evaluation model in response to the input of each of the plurality of pieces of state data. Herein, it is assumed that the indicator acquisition unit 440 acquires an indicator Ix output by the evaluation model in response to the input of the state data Sx, acquires an indicator Iy output by the evaluation model in response to the input of the state data Sy, and acquires an indicator Iz output by the evaluation model in response to the input of the state data Sz. The indicator acquisition unit 440 supplies the plurality of acquired indicators to the model selection unit 450.

In step S650, the model selection apparatus 400 selects an object model. For example, the model selection unit 450 may select an object model for controlling the controlled object 15 from among the plurality of candidate models stored in step S620 based on the plurality of indicators acquired in step S640.

At this time, the model selection unit 450 may select, as the object model, a candidate model that has output an action with which the indicator becomes the highest among the plurality of candidate models. As an example, when the plurality of indicators is Ix>Iy>Iz, the model selection unit 450 may select, as the object model, the candidate model x that has output the action Ax.

Note that in the above description, a case has been described where the model selection unit 450 selects the candidate model based on an indicator at one time point as an example, but the configuration is not limited to this. The model selection unit 450 may select the candidate model based on an amount of statistics of indicators at a plurality of time points. As an example, when the plurality of indicators is Iy_min>Iz_min>Ix_min (where min represents a minimum value at a plurality of time points), the model selection unit 450 may select, the object model, the candidate model y that has output the action Ay.

In addition, when the plurality of indicators is Iz_ave>Ix_ave>Iy_ave (where ave represents an average value at a plurality of time points), the model selection unit 450 may select, as the object model, the candidate model z that has output the action Az.

For example, in this manner, the model selection unit 450 may select, as the object model, the candidate model that has output the action with which the amount of statistics of the indicators at the plurality of time points becomes the highest among the plurality of candidate models. At this time, the amount of statistics may include at least any of an average value or a minimum value. At this time, when the candidate model is to be selected based on a plurality of amounts of statistics, the model selection unit 450 may select, as the object model, the candidate model that has output the action with which a sum of weighted addition of each amount of statistics or a weighted average becomes the highest. The model selection unit 450 supplies information for identifying the selected object model to the object model output unit 460.

In step S660, the model selection apparatus 400 outputs an object model. For example, the object model output unit 460 may duplicate the object model from among the plurality of candidate models stored in step S620 according to the information for identifying the object model selected in step S650. Then, the object model output unit 460 may output the object model to the control apparatus 500 via a network, for example. In response to this, the control apparatus 500 can start the AI control using the object model.

In step S670, the model selection apparatus 400 determines whether the object model is to be reselected. For example, the input unit 470 may accept a user input in response to the output of the object model in step S660. Then, the input unit 470 may determine that the object model is to be reselected when an instruction for reselecting the object model is received from a user.

When it is determined that the object model is to be reselected (Yes), the model selection apparatus 400 may return the process to step S630 to continue the flow. In this case, the input unit 470 may trigger the acquisition of the plurality of pieces of state data by the state data acquisition unit 430. With this configuration, the model selection apparatus 400 can acquire the plurality of pieces of state data again to reselect the object model. Note that in the above description, a case where the model selection apparatus 400 returns the process to step S630 has been illustrated as an example, but the configuration is not limited to this. The model selection apparatus 400 may return the process to step S610 to continue the flow. In this case, the input unit 470 may trigger the acquisition of the plurality of the candidate models by the candidate model acquisition unit 410. With this configuration, the model selection apparatus 400 may newly acquire the plurality of candidate models to reselect the object model from among the plurality of newly acquired candidate models.

When it is determined that the object model is not to be reselected (No), the model selection apparatus 400 ends the flow of the model selection method.

The model selection apparatus 400 can also execute the flow of such a model selection method again in response to various triggers (an event trigger and a time trigger). For example, the model selection apparatus 400 may perform the model selection method again by using the update of the evaluation model as a trigger. Accordingly, the model selection unit 450 may reselect the object model in response to the update of the evaluation model.

In addition, the model selection apparatus 400 may perform the model selection method again by using the lapse of a predetermined time since the object model has been previously selected as the trigger. Accordingly, the model selection unit 450 may reselect the object model in response to the lapse of the predetermined time.

In general, an operation model generated by reinforcement learning is put into a black box, and it is difficult to evaluate the operation model. Accordingly, when a plurality of such operation models are available, it is difficult to select which operation model is to be used for the AI control. To deal with this, the model selection apparatus 400 according to the present embodiment is configured to evaluate each of states of the equipment 10 by using an evaluation model in a case where each of manipulated variables based on the output of the plurality of candidate models is applied to the controlled object 15, and select an object model based on each of indicators output by the evaluation model. As a result, in accordance with the model selection apparatus 400 according to the present embodiment, it is possible to select which candidate model is to be used for the AI control based on objective results obtained by respectively evaluating a plurality of actions output by the plurality of candidate models by using a common evaluation model.

In addition, the model selection apparatus 400 according to the present embodiment may select, as the object model, a candidate model that has output an action with which the indicator output by the evaluation model becomes the highest among the plurality of candidate models. As a result, in accordance with the model selection apparatus 400 according to the present embodiment, it is possible to select, as the object model, the candidate model that can increase an operation target such as KPI the most.

In addition, the model selection apparatus 400 according to the present embodiment may select, as the object model, the candidate model that has output the action with which the amount of statistics of the indicators at a plurality of time points becomes the highest among the plurality of candidate models. As a result, in accordance with the model selection apparatus 400 according to the present embodiment, it is possible to select, as the candidate model, the object model that has output the action with which the indicator becomes the highest over a certain period of time on a long-term basis instead of the candidate model that has output the action with which the indicator becomes the highest on a temporary basis. At this time, an average value may be used as the amount of statistics. As a result, in accordance with the model selection apparatus 400 according to the present embodiment, it is possible to select, as the object model, the candidate model that has output the action with which the indicator is stably increased on a long-term basis. In addition, a minimum value may be used as the amount of statistics. As a result, in accordance with the model selection apparatus 400 according to the present embodiment, it is possible to select, as the object model, the optimal candidate model even when a mission critical operation like an operation in a plant is demanded.

In addition, the model selection apparatus 400 according to the present embodiment can also reselect the object model in response to the update of the evaluation model. As a result, in accordance with the model selection apparatus 400 according to the present embodiment, even when the operation target is changed, the optimal candidate model can be reselected as the object model in the light of a new operation target.

In addition, the model selection apparatus 400 according to the present embodiment can also reselect the object model in response to the lapse of the predetermined time. As a result, in accordance with the model selection apparatus 400 according to the present embodiment, even when the equipment 10 changes over time since the time point at which the object model has been previously selected, the optimal candidate model can be reselected as the object model in the light of a current situation of the equipment 10.

In addition, the model selection apparatus 400 according to the present embodiment can also accept the user input in response to the output of the object model. As a result, in accordance with the model selection apparatus 400 according to the present embodiment, after the object model is output, it is possible to feed back a result obtained by determining an appropriateness of the object model by the user. Then, in accordance with the model selection apparatus 400 according to the present embodiment, when the object model is not appropriate, the object model can be reselected.

Figure 7:
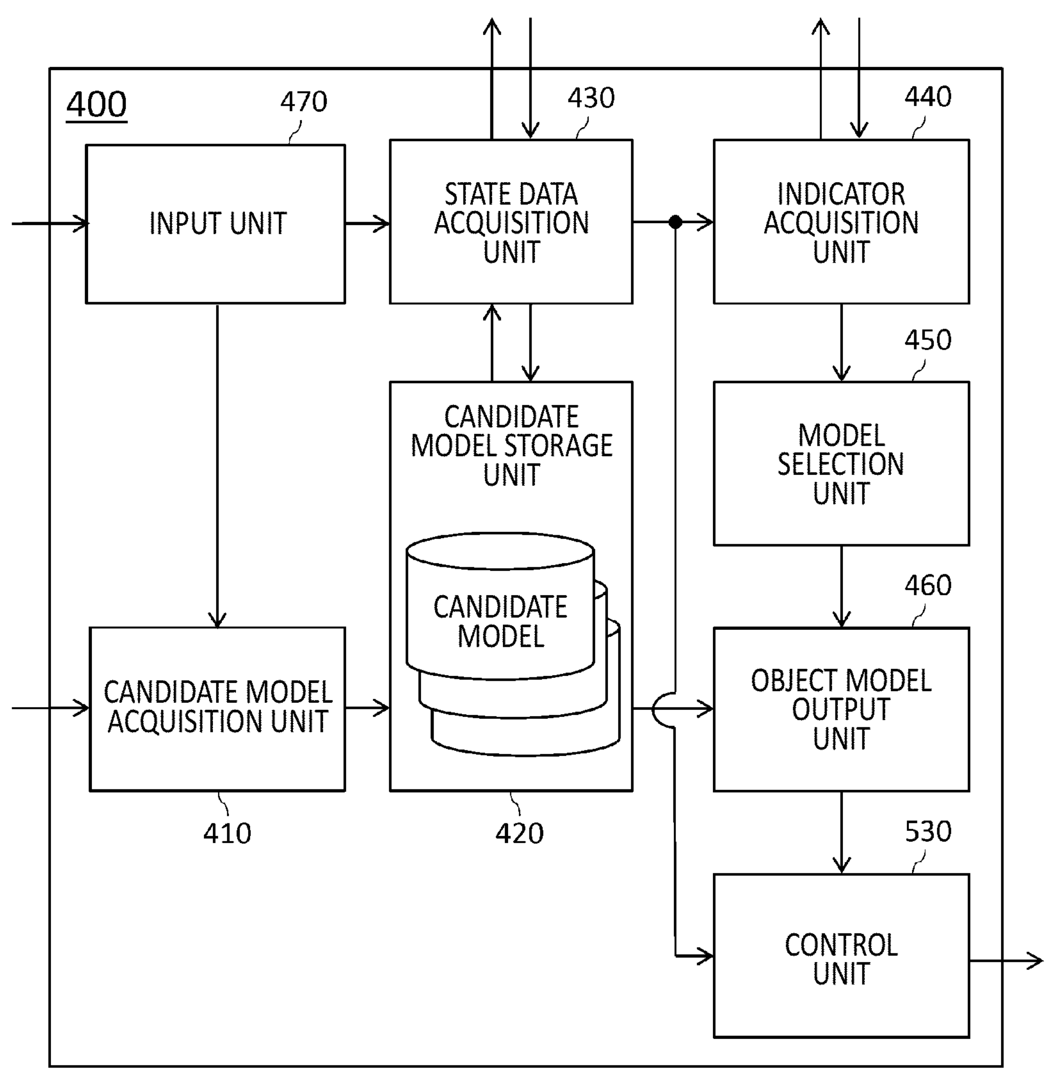
FIG. 7 illustrates an example of a block diagram of the model selection apparatus 400 according to a first modified example.

FIG. 7 illustrates an example of a block diagram of the model selection apparatus 400 according to a first modified example. In FIG. 7, members having the same functions and configurations as those in FIG. 1 are denoted by the same reference numerals, and also description thereof will be omitted below except for differences. In the embodiment described above, a case has been described as an example where the evaluation model management apparatus 200, the operation model management apparatus 300, the model selection apparatus 400, and the control apparatus 500 are provided as respectively independent separate apparatuses. However, these apparatuses may be provided as a single apparatus in which a part or whole of the apparatuses are integrated with each other. In the present modified example, in addition to the functionality of the model selection apparatus 400 according to the embodiment described above, the model selection apparatus 400 provides the functionality of the control apparatus 500.

The model selection apparatus 400 according to the present modified example may further include the control unit 530. That is, the model selection apparatus 400 may further include the control unit 530 configured to control the controlled object 15 by using the object model.

In addition, in the present modified example, the object model output unit 460 may output the selected object model to the control unit 530 instead of the control apparatus 500. Then, the control unit 530 may acquire the object model output by the object model output unit 460.

In addition, in the present modified example, the state data acquisition unit 430 may supply the state data acquired during the AI control to the control unit 530. That is, in the present modified example, the state data acquisition unit 430 may function as the actual environment data acquisition unit 520.

Then, the control unit 530 may control the controlled object 15 by using the object model. For example, in this manner, the model selection apparatus 400 may also provide the functionality as the control apparatus 500.

In this manner, the model selection apparatus 400 according to the present modified example can also control the controlled object 15 by using the object model. With this configuration, in accordance with the model selection apparatus 400 according to the present modified example, the functionality of selecting the object model and the functionality of controlling the controlled object 15 by using the selected object model can be achieved by a single apparatus. In addition, in accordance with the model selection apparatus 400 according to the present modified example, exchange of the object model is not required between the model selection apparatus 400 and the control apparatus 500, communication cost and time can be reduced.

Figure 8:
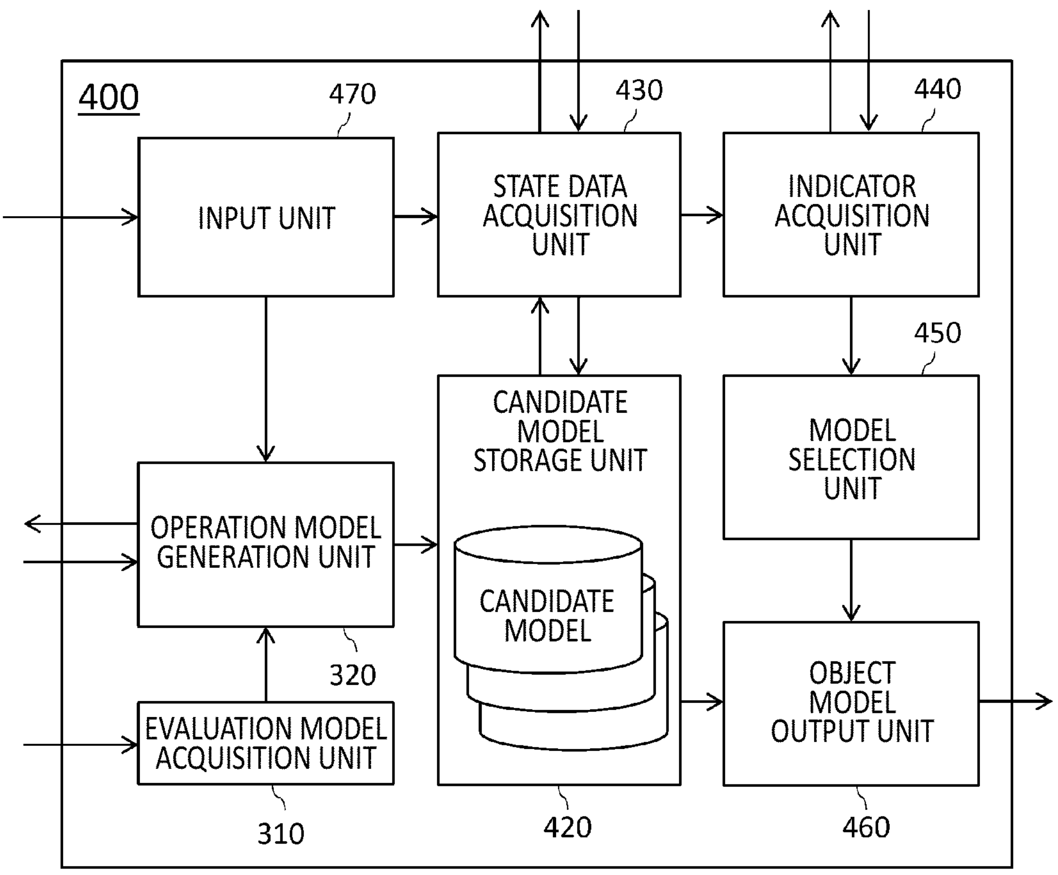
FIG. 8 illustrates an example of a block diagram of the model selection apparatus 400 according to a second modified example.

FIG. 8 illustrates an example of a block diagram of the model selection apparatus 400 according to a second modified example. In FIG. 8, members having the same functions and configurations as those in FIG. 1 are denoted by the same reference numerals, and also description thereof will be omitted below except for differences. In the present modified example, in addition to the functionality of the model selection apparatus 400 according to the embodiment described above, the model selection apparatus 400 provides the functionality of the operation model management apparatus 300.

The model selection apparatus 400 according to the present modified example may further include the evaluation model acquisition unit 310 and the operation model generation unit 320. That is, the model selection apparatus 400 may further include an operation model generation unit configured to generate, by reinforcement learning, a plurality of operation models serving as a plurality of candidate models.

In addition, in the present modified example, the operation model generation unit 320 may supply the plurality of generated operation models to the candidate model storage unit 420. Then, the candidate model storage unit 420 may store, as the plurality of candidate models, the plurality of operation models supplied from the operation model generation unit 320.

In addition, in the present modified example, when the object model is to be reselected, the input unit 470 may trigger the generation of the plurality of operation models by the operation model generation unit 320. With this configuration, the model selection apparatus 400 according to the present modified example may newly generate a plurality of operation models serving as a plurality of candidate models, and reselect the object model from among the plurality of generated candidate model. For example, in this manner, the model selection apparatus 400 may also provide the functionality of the operation model management apparatus 300.

In this manner, the model selection apparatus 400 according to the present modified example can also generate, by reinforcement learning by its own, the plurality of operation models serving as the plurality of candidate models. With this configuration, in accordance with the model selection apparatus 400 according to the present modified example, the functionality of generating the plurality of operation models serving as the candidates for selecting the object model and the functionality of selecting the object model can be achieved by a single apparatus. In addition, in accordance with the model selection apparatus 400 according to the present modified example, exchange of the plurality of operation models is not required between the operation model management apparatus 300 and the model selection apparatus 400, the communication cost and the time can be reduced.

Figure 9:
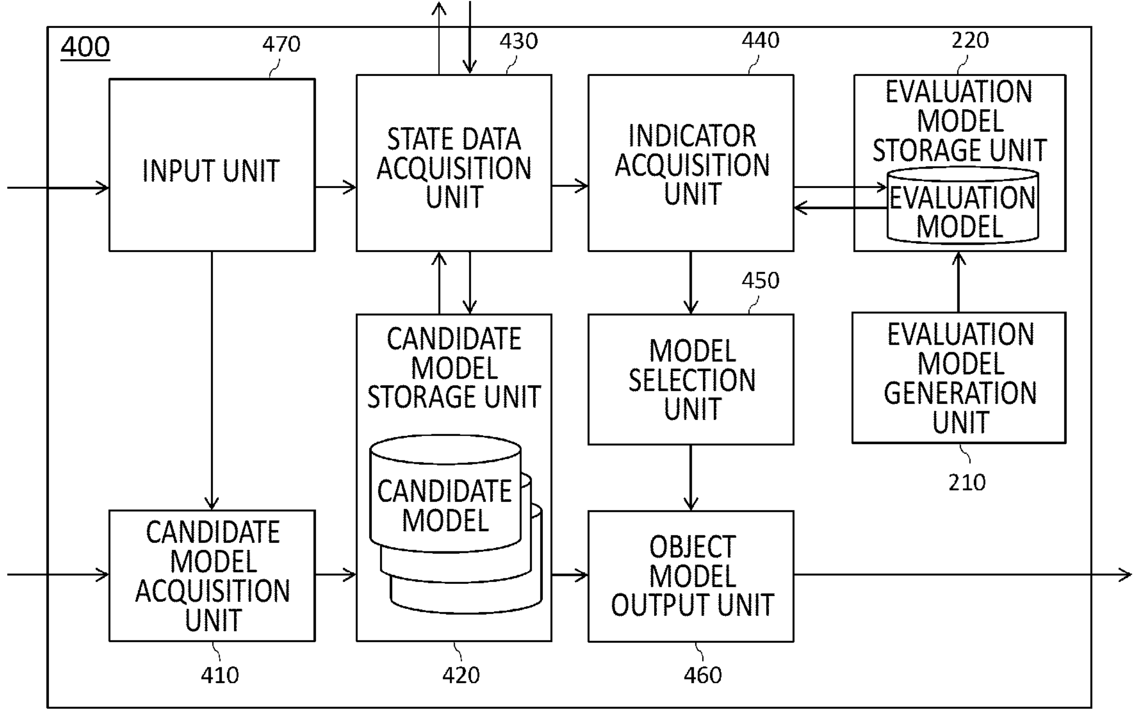
FIG. 9 illustrates an example of a block diagram of the model selection apparatus 400 according to a third modified example.

FIG. 9 illustrates an example of a block diagram of the model selection apparatus 400 according to a third modified example. In FIG. 9, members having the same functions and configurations as those in FIG. 1 are denoted by the same reference numerals, and also description thereof will be omitted below except for differences. In the present modified example, in addition to the functionality of the model selection apparatus 400 according to the embodiment described above, the model selection apparatus 400 provides the functionality of the evaluation model management apparatus 200.

The model selection apparatus 400 according to the present modified example further includes the evaluation model generation unit 210 and the evaluation model storage unit 220. That is, the model selection apparatus 400 may further include the evaluation model storage unit 220 configured to store the evaluation model. In addition, the model selection apparatus 400 may further include the evaluation model generation unit 210 configured to generate the evaluation model by machine learning.

In addition, in the present modified example, the indicator acquisition unit 440 may input each of the plurality of pieces of the state data to an evaluation model stored in the evaluation model storage unit 220, and acquire each of the plurality of indicators output by the evaluation model. For example, in this manner, the model selection apparatus 400 may also provide the functionality as the evaluation model management apparatus 200.

In this manner, the model selection apparatus 400 according to the present modified example can also store the evaluation model. With this configuration, in accordance with the model selection apparatus 400 according to the present modified example, upon acquisition of the plurality of indicators, exchange of the plurality of pieces of state data or the plurality of indicators is not required with the evaluation model management apparatus 200, and the communication cost and the time can be reduced. In addition, the model selection apparatus 400 according to the present modified example can also generate the evaluation model by machine learning by its own. With this configuration, in accordance with the model selection apparatus 400 according to the present modified example, the functionality of generating the evaluation model and the functionality of selecting the object model can be achieved by a single apparatus.

The modes that may be implemented have been described above for illustrative purposes. However, the above described embodiment may be modified or applied in various forms. For example, in the modified examples described above, cases where the model selection apparatus 400 further provides the functionalities of the control apparatus 500, the operation model management apparatus 300, and the evaluation model management apparatus 200 have been illustrated as separate modified examples. However, the present invention is not limited to this. The model selection apparatus 400 may further provide two or more functionalities of the control apparatus 500, the operation model management apparatus 300, and the evaluation model management apparatus 200, or may further provide all of the functionalities. With this configuration, in accordance with the model selection apparatus 400, the functionalities according to all the operations for controlling the controlled object 15 can be achieved by a single apparatus.

In addition, in the above description, upon acquisition of the plurality of pieces of state data, a case where the model selection apparatus 400 applies, to the controlled object 15 in the actual equipment 10, each of the manipulated variables based on the outputs of the plurality of candidate models and acquires the plurality of pieces of state data from the actual equipment 10 has been illustrated as an example, but the configuration is not limited to this. The model selection apparatus 400 may apply, to the controlled object in the simulation environment, each of the manipulated variables based on the outputs of the plurality of candidate models, and acquire the plurality of pieces of state data from the simulator 100. With this configuration, the model selection apparatus 400 can complete the flow up to the selection of the object model in the simulation environment without using an actual device.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer readable instructions stored on computer readable media, and/or processors supplied with computer readable instructions stored on computer readable media. Dedicated circuitry may include digital and/or analog hardware circuits, and may include integrated circuits (IC) and/or discrete circuits. The programmable circuitry may include a reconfigurable hardware circuit including logical AND, logical OR, logical XOR, logical NAND, logical NOR, and other logical operations, a memory element such as a flip-flop, a register, a field programmable gate array (FPGA) and a programmable logic array (PLA), and the like.

A computer readable medium may include any tangible device that can store instructions to be executed by a suitable device, and as a result, the computer readable medium having instructions stored thereon includes an article of manufacture including instructions which can be executed in order to create means for performing operations specified in the flowcharts or block diagrams. Examples of the computer readable medium may include an electronic storage medium, a magnetic storage medium, an optical storage medium, an electromagnetic storage medium, a semiconductor storage medium, and the like. More specific examples of the computer readable medium may include a floppy disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disk (DVD), a Blu-ray (registered trademark) disk, a memory stick, an integrated circuit card, and the like.

The computer readable instruction may include: an assembler instruction, an instruction-set-architecture (ISA) instruction; a machine instruction; a machine dependent instruction; a microcode; a firmware instruction; state-setting data; or either a source code or an object code written in any combination of one or more programming languages, including an object oriented programming language such as Smalltalk (registered trademark), JAVA (registered trademark), C++, or the like; and a conventional procedural programming language such as a "C" programming language or a similar programming language.

Computer readable instructions may be provided to a processor of a general purpose computer, special purpose computer, or other programmable data processing apparatuses, or to programmable circuitry, locally or via a local area network (LAN), wide area network (WAN) such as the Internet, or the like, to execute the computer readable instructions in order to create means for performing operations specified in the flowcharts or block diagrams. Examples of the processor include a computer processor, a processing unit, a microprocessor, a digital signal processor, a controller, a microcontroller, and the like.

Figure 10:
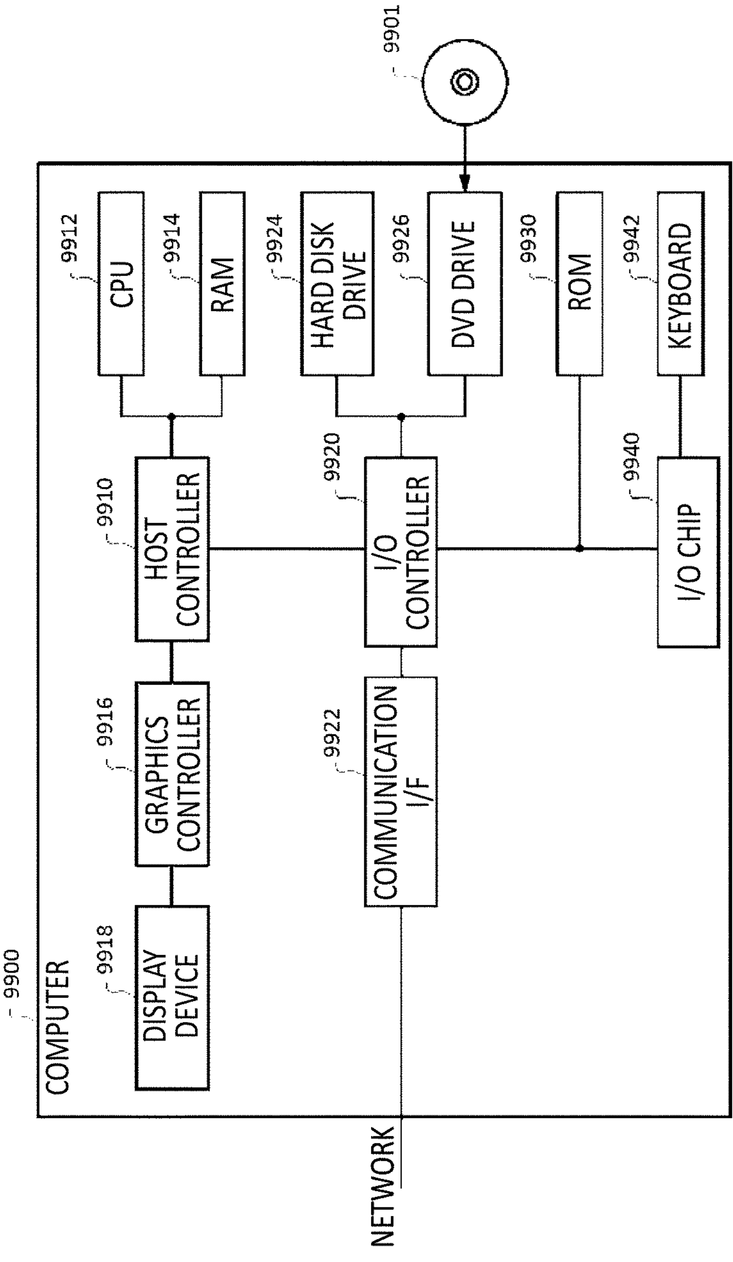
FIG. 10 illustrates an example of a computer 9900 in which a plurality of aspects of the present invention may be wholly or partially embodied.

FIG. 10 illustrates an example of a computer 9900 in which a plurality of aspects of the present invention may be wholly or partially embodied. A program that is installed in the computer 9900 can cause the computer 9900 to function as or execute operations associated with the apparatus according to the embodiment of the present invention or one or more sections of the apparatus, and/or cause the computer 9900 to execute the processes of the embodiment of the present invention or steps thereof. Such a program may be executed by a CPU 9912 so as to cause the computer 9900 to execute certain operations associated with some or all of the flowcharts and the blocks in the block diagrams described in the present specification.

The computer 9900 according to the present embodiment includes the CPU 9912, a RAM 9914, a graphics controller 9916 and a display device 9918, which are mutually connected by a host controller 9910. The computer 9900 further includes input/output units such as a communication interface 9922, a hard disk drive 9924, a DVD drive 9926 and an IC card drive, which are connected to the host controller 9910 via an input/output controller 9920. The computer also includes legacy input/output units such as a ROM 9930 and a keyboard 9942, which are connected to the input/output controller 9920 via an input/output chip 9940.

The CPU 9912 operates according to programs stored in the ROM 9930 and the RAM 9914, thereby controlling each unit. The graphics controller 9916 acquires image data generated by the CPU 9912 on a frame buffer or the like provided in the RAM 9914 or in itself, and to cause the image data to be displayed on the display device 9918.

The communication interface 9922 communicates with other electronic devices via a network. The hard disk drive 9924 stores programs and data that are used by the CPU 9912 within the computer 9900. The DVD drive 9926 reads programs or data from a DVD-ROM 9901, and to provide the hard disk drive 9924 with the programs or data via the RAM 9914. The IC card drive reads the programs and the data from the IC card, and/or writes the programs and the data to the IC card.

The ROM 9930 stores therein a boot program or the like executed by the computer 9900 at the time of activation, and/or a program depending on the hardware of the computer 9900. The input/output chip 9940 may also connect various input/output units via a parallel port, a serial port, a keyboard port, a mouse port or the like to the input/output controller 9920.

A program is provided by a computer readable medium such as the DVD-ROM 9901 or the IC card. The program is read from the computer readable medium, installed into the hard disk drive 9924, the RAM 9914, the ROM 9930, which are also examples of a computer readable medium, and executed by the CPU 9912. The information processing described in these programs is read into the computer 9900, resulting in cooperation between a program and the above-mentioned various types of hardware resources. An apparatus or method may be constituted by realizing the operation or processing of information in accordance with the usage of the computer 9900.

For example, when communication is performed between the computer 9900 and an external device, the CPU 9912 may execute a communication program loaded onto the RAM 9914 to instruct communication processing to the communication interface 9922, based on the processing described in the communication program. The communication interface 9922, under control of the CPU 9912, reads transmission data stored on a transmission buffer region provided in a recording medium such as the RAM 9914, the hard disk drive 9924, the DVD-ROM 9901, or the IC card, and transmits the read transmission data to a network or writes reception data received from a network to a reception buffer region or the like provided on the recording medium.

In addition, the CPU 9912 may cause all or a necessary portion of a file or a database to be read into the RAM 9914, wherein the file or the database has been stored in an external recording medium such as the hard disk drive 9924, the DVD drive 9926 (DVD-ROM 9901), the IC card, etc., and perform various types of processing on the data on the RAM 9914. The CPU 9912 then writes back the processed data to the external recording medium.

Various types of information such as various types of programs, data, tables, and databases may be stored in a recording medium and subjected to information processing. The CPU 9912 may perform various types of processing on the data read from the RAM 9914, which includes various types of operations, information processing, condition judging, conditional branch, unconditional branch, search/replacement of information, etc., as described throughout this disclosure and designated by an instruction sequence of programs, and writes the result back to the RAM 9914. In addition, the CPU 9912 may search for information in a file, a database, etc., in the recording medium. For example, when a plurality of entries, each having an attribute value of a first attribute associated with an attribute value of a second attribute, are stored in the recording medium, the CPU 9912 may search for an entry whose attribute value of the first attribute matches the condition a designated condition, from among the plurality of entries, and read the attribute value of the second attribute stored in the entry, thereby obtaining the attribute value of the second attribute associated with the first attribute satisfying the predetermined condition.

The above described program or software modules may be stored in the computer readable medium on the computer 9900 or near the computer 9900. In addition, a recording medium such as a hard disk or a RAM provided in a server system connected to a dedicated communication network or the Internet can be used as the computer readable medium, thereby providing the program to the computer 9900 via the network.

While the present invention has been described above by way of the embodiments, the technical scope of the present invention is not limited to the above described embodiments. It is apparent to persons skilled in the art that various alterations and improvements can be added to the above described embodiments. It is also apparent from the description of the claims that the embodiments to which such alterations or improvements are made can be included in the technical scope of the present invention.

The operations, procedures, steps, and stages of each process performed by an apparatus, system, program, and method shown in the claims, specification, or drawings can be performed in any order as long as the order is not indicated by "prior to," "before," or the like and as long as the output from a previous process is not used in a later process. Even if the process flow is described using phrases such as "first" or "next" in the claims, specification, or drawings, it does not necessarily mean that the process must be performed in this order.

EXPLANATION OF REFERENCES

1: control system;
10 equipment;
15 controlled object;
100: simulator;
200: evaluation model management apparatus;
210: evaluation model generation unit;
220: evaluation model storage unit;
230: evaluation model output unit;

300: operation model management apparatus;
310: evaluation model acquisition unit;
320: operation model generation unit;
330: operation model storage unit;
340: operation model output unit;
400: model selection apparatus;
410: candidate model acquisition unit;
420: candidate model storage unit;
430: state data acquisition unit;
440: indicator acquisition unit;
450: model selection unit;
460: object model output unit;
470: input unit;
500: control apparatus;
510: object model acquisition unit;
520: actual environment data acquisition unit;
530: control unit;
9900: computer;
9901: DVD-ROM;
9910: host controller;
9912: CPU;
9914: RAM;
9916: graphics controller;
9918: display device;
9920: input/output controller;
9922: communication interface;
9924: hard disk drive;
9926: DVD drive;
9930: ROM;
9940: input/output chip;
9942: keyboard.

What is claimed is:

1. A model selection apparatus comprising:

a computer provided with computer-readable instructions such that, when the computer-readable instructions are executed by the computer, the model selection apparatus is configured to execute the method comprising:

storing a plurality of candidate models each of which is generated by reinforcement learning using, as at least a part of a reward, an output of an evaluation model configured to output an indicator obtained by evaluating a state of equipment and is capable of outputting an action according to the state of the equipment;

acquiring a plurality of pieces of state data representing the state of the equipment in a case where each of manipulated variables based on outputs of the plurality of candidate models is applied to a controlled object in the equipment;

acquiring a plurality of indicators output by the evaluation model in response to an input of each of the plurality of pieces of state data;

selecting an object model for controlling the controlled object from among the plurality of candidate models based on the plurality of indicators;

outputting the object model selected in the selecting an object model; and controlling the controlled object based on the selected object model.

2. The model selection apparatus according to claim 1, wherein the selecting an object model comprises selecting, as the object model, a candidate model that has output an action with which the indicator becomes highest among the plurality of candidate models.

3. The model selection apparatus according to claim 2, wherein the selecting an object model further comprises selecting, as the object model, a candidate model that has output an action with which an amount of statistics of the indicators at a plurality of time points becomes highest among the plurality of candidate models.

4. The model selection apparatus according to claim 3, wherein the amount of statistics includes at least any of an average value or a minimum value.

5. The model selection apparatus according to claim 2, wherein the method further comprises accepting a user input in response to an output of the object model.

6. The model selection apparatus according to claim 2, further comprising a controller configured to receive the object model selected in the selecting an object model and control the controlled object by using the object model selected in the selecting an object model.

7. The model selection apparatus according to claim 2, wherein the method further comprises generating, by the reinforcement learning, a plurality of operation models to serve as the plurality of candidate models.

8. The model selection apparatus according to claim 2, further comprising one or more recording media selected from the group consisting of memory, disk drives, and IC-cards configured to store the evaluation model.

9. The model selection apparatus according to claim 2, wherein the method further comprises generating the evaluation model by machine learning.

10. The model selection apparatus according to claim 1, wherein the method further comprises reselecting the object model in response to an update of the evaluation model.

11. The model selection apparatus according to claim 1, wherein the method further comprises reselecting the object model in response to a lapse of a predetermined time period.

12. The model selection apparatus according to claim 1, wherein the method further comprises accepting a user input in response to an output of the object model.

13. The model selection apparatus according to claim 1, further comprising a controller configured to receive the object model selected in the selecting an object model and control the controlled object by using the object model selected in the selecting an object model.

14. The model selection apparatus according to claim 1, wherein the method further comprises generating, by the reinforcement learning, a plurality of operation models to serve as the plurality of candidate models.

15. The model selection apparatus according to claim 1, further comprising one or more recording media selected from the group consisting of memory, disk drives, and IC-cards configured to store the evaluation model.

16. The model selection apparatus according to claim 1, wherein the method further comprises generating the evaluation model by machine learning.

17. The model selection apparatus according to claim 1, wherein the controlled object comprises one or more objects selected from a group consisting of a valve, a heater, a motor, a fan, and a switch.

18. The model selection apparatus according to claim 1, wherein the plurality of state data comprises one or more members of a group consisting of a process variable, a manipulated variable, performance data, consumption data, and disturbance environment data.

19. A model selection method executed by a computer to cause the computer to perform operations comprising:

storing a plurality of candidate models each of which is generated by reinforcement learning using, as at least a part of a reward, an output of an evaluation model configured to output an indicator obtained by evaluating a state of equipment and is capable of output an action according to the state of the equipment;

acquiring a plurality of pieces of state data representing the state of the equipment in a case where each of manipulated variables based on outputs of the plurality of candidate models is applied to a controlled object in the equipment;

acquiring a plurality of indicators output by the evaluation model in response to an input of each of the plurality of pieces of state data;

selecting an object model for controlling the controlled object from among the plurality of candidate models based on the plurality of indicators;

outputting the object model; and controlling the controlled object based on the selected object model.

20. A non-transitory, computer-readable medium having recorded thereon a model selection program that, when executed by a computer, causes the computer to execute a method comprising:

storing a plurality of candidate models each of which is generated by reinforcement learning using, as at least a part of a reward, an output of an evaluation model configured to output an indicator obtained by evaluating a state of equipment and is capable of outputting an action according to the state of the equipment;

acquiring a plurality of pieces of state data representing the state of the equipment in a case where each of manipulated variables based on outputs of the plurality of candidate models is applied to a controlled object in the equipment;

acquiring a plurality of indicators output by the evaluation model in response to an input of each of the plurality of pieces of state data;

selecting an object model for controlling the controlled object from among the plurality of candidate models based on the plurality of indicators;

outputting the object model; and controlling the controlled object based on the selected object model.

* * * * *